Figure 1:
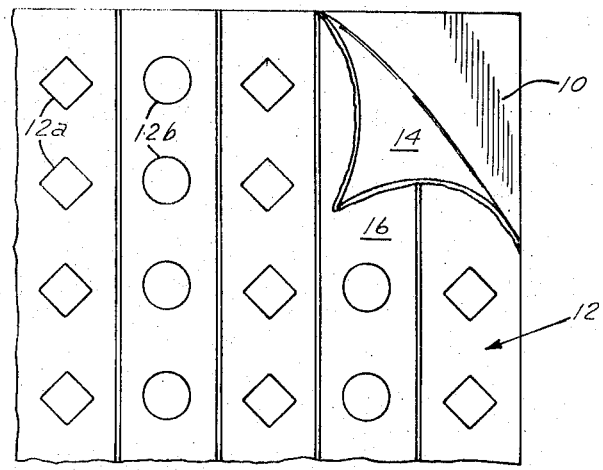

United States Patent [19]
Scott

[11] 3,844,527
[45] Oct. 29, 1974

[54] WATER RESERVOIR LINER FOR CONCRETE FORMS

[76] Inventor: Sam C. Scott, 9015 E. Mansfield, Denver, Colo. 80237

[22] Filed: Sept. 6, 1973

[21] Appl. No.: 394,920

Related U.S. Application Data

[63] Continuation-in-part of Ser. No. 215,370, Jan. 4, 1972, Pat. No. 3,759,481.

[52] U.S. Cl................. 249/189, 161/159, 161/165, 249/16, 249/112, 249/134
[51] Int. Cl............................................. E04g 9/10
[58] Field of Search.................... 161/159, 160, 165; 117/5.1; 249/16, 112, 189, 134

[56] References Cited
UNITED STATES PATENTS

| | | | |
|---|---|---|---|
| 3,427,178 | 2/1969 | Zaleim et al.......................... | 117/5.1 |
| 3,694,530 | 9/1972 | Wolfe................................. | 161/159 |

Primary Examiner—William J. Van Balen
Attorney, Agent, or Firm—Richard D. Law

[57] ABSTRACT

A liner for concrete forms comprises a self-skinning, flexible foam of elastomeric material formed into sheets for lining a concrete form. The liner includes at least one dense but permeable concrete contacting face or skin leaving its configuration in the set concrete, and an open cell foam core which takes up water and air passing through the contacting skin into the foam from the surface of freshly poured concrete, particularly on vibration of the concrete. Water and air separate in the foam core with the air passing upwardly and out of the core, leaving a reservoir of water in the open cells of the core, thereby maintaining a wet surface on the contacting face of the concrete, and which water migrates back into the concrete as it cures, taking up water.

7 Claims, 4 Drawing Figures

WATER RESERVOIR LINER FOR CONCRETE FORMS

This invention includes the subject matter of Disclosure Document No. 019972, dated June 13, 1973, in the U.S. Patent Office, and is an improvement and a continuation-in-part over my invention of a flexible elastomeric liner set out in my U.S. Pat. application Ser. No. 215,370, filed Jan. 4, 1972 now U.S. Pat. 3,759,481, for MULTIPLE USE CONCRETE FORM LINER.

GENERAL DESCRIPTION OF THE INVENTION

This invention relates to soft, permeable self-skinning elastomeric foam liners for concrete forms, particularly for use in molding concrete structures with architectural surfaces on the concrete. The liners are permeable to air and water, and pass air and water from freshly poured concrete, particularly vibrated concrete. The core of foamed elastomeric material takes up air and water from the concrete, and it is arranged so that air separates from the water, passes upwardly through the core, while the core retains the water which is available for reverse flow to the concrete during hydration of the curing concrete. The foam liner for the concrete forms maintains water against the face of the concrete during curing and removes air and water bubbles which are drawn or forced to the face of the concrete on vibration, thereby preventing pitting of the face of the concrete with unsightly voids, commonly called bug holing. The foam liner takes up separated water and air adjacent to its surface, removes the bubbles and permits the cement matrix to flow into the bubble spaces so that the face of the concrete sets solidly, forming a textured surface which is densified and resistant to moisture. The foam liner of the invention can easily strip from cured concrete without the use of release agents on the liner, thereby avoiding staining of the concrete by the release agents. The dense skin of the liner bridges the open cell core to provide structural integrity to the liner and on taking up water becomes essentially non-compressible, so that the detail of the mold face is accurately and precisely set in the finished concrete in exacting detail.

BACKGROUND OF THE INVENTION

In the forming of concrete structures, particularly buildings, etc., where the concrete has large, generally planar surface areas exposed after the removal of forms, a recent practice, according to my above-entitled application, has been to use flexible elastomeric, generally impervious liners on at least a portion of the concrete forms for face engagement with the poured concrete. These liners may be smooth surfaces or may contain negative mold portions or patterns providing surface designs in the forming concrete and this is generally called architectural concreting. The designs may simulate brick, rock, wood, weathered wood, fluted, broken fluted, etc., depending on the desires of the architect. These impervious liners tend to prevent seeping of the concrete water from the concrete mass and during vibration compaction occurs within the wet concrete separating water and air bubbles which are trapped at the inter-face of the liner and the concrete causing voids, bug holes and like flaws in the surface of the finished concrete. Wooden forms, usually treated plywood, steel forms, etc., likewise, trap air and water at the inter-face which, also, causes the flaws and the like in the surface of the dried concrete.

A gum rubber lining for concrete form is suggested in U.S. Pat. No. 3,602,476 for making a template for simulated brick faced masonry. The rubber, of course, is non-permeable to water and air and it affects the chemicals in the cement water of the concrete mix. This type of form permits the formation of air and water bubbles at the face of the concrete causing flaws in the finished concrete. A concrete form with a thin rigid nonpermeable plastic or resin layer is described in Willingham U.S. Pat. No. 3,650,795; however, this, also, permits the formation of air and water bubbles at the face of the concrete, thereby causing flaws in the finished surface of the concrete. A liner for a concrete form is, also, shown in U.S. Pat. No. 2,627,100 wherein it is explained that an inner lining facing plate formed of plastic or other suitable material may be provided for a concrete form, obviously indicating that the plate is rigid and nonpermeable to water and air. Absorbent concrete form liners have been suggested; however, the separated water is absorbed in the liner material and is lost to the concrete matrix.

Included among the objects and advantages of the present invention is to provide a foam liner for concrete forms which accepts water and air from freshly poured concrete, separating air from the water and then releasing water back into the concrete during the curing as required.

Another object of the present invention is to provide a soft, flexible foamed elastomeric liner for concrete to separate air and water from the inter-face between freshly poured concrete and the liner providing a smooth dense surface for the finished concrete.

Another object of the invention is to provide a reusable liner for concrete forms.

Yet another object of the invention is to provide a liner for concrete forms which maintains a wet surface for the curing concrete, and provides water which may be taken up by the curing concrete if necessary.

Still another object of the invention is to provide a flexible, resilient, elastomeric concrete form liner which is of light weight material and is useful for plural pours of concrete.

An additional object of the invention is to provide a light-weight, flexible elastomeric concrete form liner which includes a negative mold of the desired configuration of the finished concrete including undercuts and large, gross depth variances in the surface of the finished concrete.

A further object of the invention is to provide a concrete form liner form useful as top molding member of horizontal molding, stack molding, etc., providing architectural designs in the finished concrete.

A still further object of the invention is to provide a concrete form liner which provides insulation for curing concrete in a form.

Figure 4:
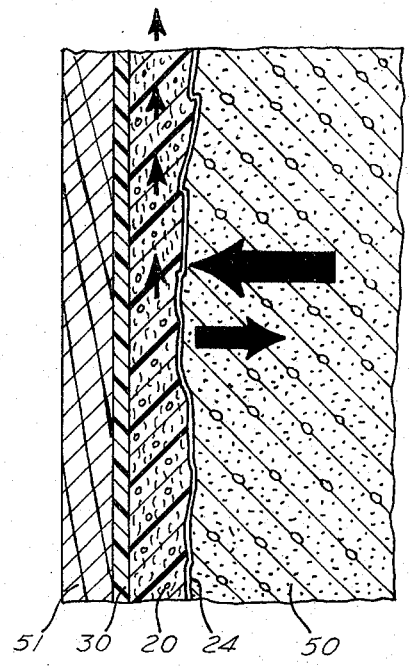
Figure 2:
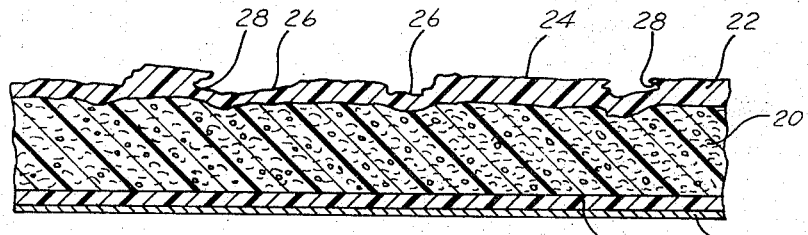
Figure 3:
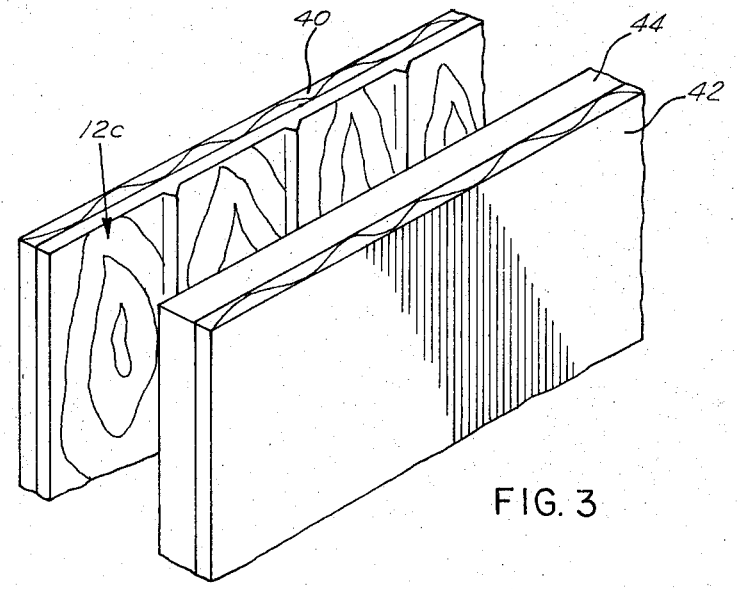

These and other objects and advantages of the invention may be readily ascertained by referring to the description and the appended illustrations in which:

FIG. 1 is a front elevational view of a portion of a concrete form with a liner secured thereto, FIG. 2 is a cross-sectional view of a liner according to the invention showing the flexible foamed core and the elastomeric dense skin thereof, FIG. 3 is a partial perspective view of a portion of a form of making a concrete wall illustrating the use of the liner of the invention on both sides of the wall form, and FIG. 4 is a cross-sectional view of the liner placed against a form with freshly poured concrete thereagainst and illustrating the movement of air and water in the system.

In the device illustrated in FIG. 1, the concrete form 10 is lined with a soft, flexible, elastomeric, self skinning foamed liner, shown in general by numeral 12, which includes a generally smooth back 14 arranged for face engagement with the surface of the panel 10, and a decorative face 16 which is in effect a negative mold of the finished concrete face. The panel of form 10 may be of any conventionally used concrete form such as plywood, steel, or the like, and the form liner 12 is secured to the form in any conventional means for securing the liner to the form panel. As illustrated, the liner 12 is a flexible, elastomeric material which may be peeled either from the concrete or from the form depending on the particular system. The form liner 12 includes a series of geometric patterns 12a and 12b. However, the surface may be contoured into any desired configuration, representing various material such as stone, brick, wood, etc., or into special effects.

As illustrated in FIG. 2, a liner according to the invention includes a foamed core 20, a dense skin 22 having a decorative surface 24 which imparts its configuration in the finished concrete. This surface may include depressions 26, undercuts 28 or the like, depending on the particular image desired in the concrete. The skin is soft and flexible enough to be deformed as it is pulled from the finished concrete, including undercuts, without destroying the base relief or design in the concrete. The rear surface of the liner includes a skin 30 which may or may not include a backing member 32 (which may be paper, cardboard, glass fibers, glass fiber cloth, metal cloth, or the like).

The use of the liner of the invention is shown in FIG. 3, where a concrete wall form includes a wall panel section 40 having an opposed wall panel section which is spaced apart a sufficient distance to form the necessary thickness of wall. These forms are secured together in conventional manner by walers, conventional supports and the like and may be held together by conventional concrete ties, etc. A soft, resilient elastomeric foam core liner 12c is secured against the panel 40 in any desired manner, and the face of the liner 12c imparts its weathered wood configuration to the finished concrete. In a similar manner, a concrete form liner of flexible, foamed elastomeric material 44, according to the invention, is secured to the form panel 42. This liner may, also, have a decorative face, or it may have a smooth face to provide a very smooth lining which is imparted to the opposite face of the concrete after being poured and vibrated. Thus a wall or panel may have one or two designed faces as may be desired.

The liner according to the invention is a flexible, elastomeric, soft, resilient, integral skin flexible foam (or self skinning plastics in cellular form) made of such synthetic resins as polyurethane, polyvinyl, polyethylene, epoxy, cellular vinyl, expandable polystyrene, foamed silicones, etc., resins which are foamed and have integral skins. The liners of the invention are cast in a form or mold in which the bottom of the mold contains the configuration of the desired characteristics, which may be simulated wood, simulated weathered wood, simulated rock, simulated brick, smooth, or any desired configuration for a concrete surface. The ingredients of the foam resin are mixed, poured into the form and permitted to cure. The actual mixing, cure times and the like are determined by the particular ingredients used for the particular foam.

The following examples are illustrative of the self skinning foam plastics which are useful for the present invention.

Example 1

A self-skinning flexible foam is formed of CPR 1938N and 1938F, manufactured by the CPR Division of Upjohn Co., 555 Alaska Ave., Torrence, Calif. 90503. The plastic is purchased as Component A and Component B. For both the CPR 1938F and CPR 1938N, Component A is mixed in 33.3 parts by weight with 66.7 parts by weight of Component B. At 75° F. ambient temperature the cream time of ingredients is 12–17 seconds, the rise time is 35–60 seconds, the pack free time is 1.0–1.5 minutes and a demold time of 10 minutes. The foam is cured in 24 hours at about room temperature.

With the liner released from the mold it has about the following physical properties:

Table I

|  | ASTM Method | Skin | Core |
|---|---|---|---|
| Density, pcf | — | — | 6.7 |
| Hardness, Shore A | D2240-68 | 75 | — |
| Shore 00 | D2240-68 | — | 50 |
| Tensile Strength, psi | D412-68 | 1480 | 73 |
| 100% Modulus | D412-68 | 1300 | 73 |
| Ultimate Elongation, % | D412-68 | 120 | 100 |
| Elongation Set, % | D412-68 | 7.0 | 5.0 |
| Tear Strength, Die C, pli | D624-54 | 134 | 9.0 |
| Tear Strength, Split, pli | D470-71 | 20 | — |
| Compression Set, % | D395-69, Method B | — | 25 |
| Taber Abrasion, mg loss (H-22 wheel, 1000 g weight, 1000 revolutions) | — | 9.0 | — |
| Puncture Resistance, lbs. | DMS 1957 | 18.0 | — |
| Compression-Deflection, psi 10% | D575-69 | — | 4.5 |
| 20% | D575-69 | — | 5.0 |
| 30% | D575-69 | — | 6.0 |
| 40% | D575-69 | — | 8.0 |
| 50% | D575-69 | — | 11.0 |

Example 2

A polyurethane resin is prepared using Reichhold Chemicals, White Plains, New York 10602, Polylite Polyurethane Resin 9.0–589/9.0–590. The resin is prepared by mixing 1 part by weight of Component A (which is 9.0–589) to 2 parts by weight of Component B (which is 9.0–590). The mix has a cream time of 10–15 seconds, a rise time of 65–75 seconds, a tack free time of 140–160 seconds. The mold temperature should be in the range of 120° F.–140° F. with a demold time of 10–20 minutes. After the materials have been mixed, placed in the mold and permitted to rise and cure, air pressure may be introduced into the liner prior to opening the mold by penetrating the skin through a pouring hole which equalizes the pressure in the liner and the mold and also functions to break any residual closed cells, thereby producing an open cell foam.

The recovered liner from the mold has the physical characteristics shown below:

TABLE II

TYPICAL FOAM PHYSICAL PROPERTIES (CORE)

| | |
|---|---|
| Overall Density | 12–13 lbs./ft.$^3$ |
| Core Density | 4.8–5.2 lbs./ft.$^3$ |
| Tensile Strength | 42–46 psi |
| Elongation | 160–170% |
| Tear Resistance | 2.5–3.0 lbs./in. |
| 50% Compression Set | 3.3–3.8% |
| 25% CLD | 0.9–1.1 psi |
| Humid Aging Load Loss (3 hrs. at 220°F.) | 20–21% |

TYPICAL PHYSICAL PROPERTIES (SKIN)

| | |
|---|---|
| Tensile Strength | 435–447 psi |
| Elongation | 150–155% |
| Die "C" Tear | 55–60 psi |
| Hardness, Shore A | 35–40 |
| 100% Modulus | 275–285 psi |
| Puncture Resistance | 17–18 lbs. |

Minimum required demolding time may be shorter or longer depending upon part configuration and molding conditions. It may be necessary, in order to prevent shrinkage of the molded part, to puncture the top or backside skin while demolding so that air can enter the core.

Example 3

Following the procedures set forth in Example 2, Reichhold Polylite Polyurethane Resin 9.0–589/9-.0–606 is produced with a mixed ratio of A/B on a weight basis of 1.0/1.75. This mixture has a cream time of 10–15 seconds, a rise time of 60–70 seconds, and a tack free time of 115–135 seconds. Using a mold temperature the same as in Example 2, the demold time is 10–20 minutes. The recovered skinned foam has the following typical physical properties:

TABLE III

TYPICAL FOAM PHYSICAL PROPERTIES (CORE)

| | |
|---|---|
| Overall Density | 8–10 lbs./ft.$^3$ |
| Core Density | 3.3–4.3 lbs./ft.$^3$ |
| Tensile Strength | 47–57 psi |
| Elongation | 154–164% |
| Tear Resistance | 2.9–3.5 lbs./in. |
| 50% compression Set | 6.5–7.5% |
| 25% CLD | 1.2–1.4 psi |
| Humid Aging Load Loss (3 hrs. at 220°F.) | 17–19% |

TYPICAL PHYSICAL PROPERTIES (SKIN)

| | |
|---|---|
| Tensile Strength | 738–786 psi |
| Elongation | 147–152% |
| Die "C" Tear | 93–103 psi |
| Hardness, Shore A | 46–54 |
| 100% Modulus | 535–575 psi |
| Puncture Resistance | 17.6–18.4 lbs. |

Example 4

A urethane foam resin may be produced from the materials of Freeman, a subsidiary of H. H. Robinson Co., P.O. Box 247, Port Washington, Wisconsin, called Chempol 30–1,944/30–2,016. An integral skin foam of the flexible urethane having a density of about 4.0 pounds per cubic foot will be produced by mixing 100 parts by weight of 30–1,944 with 37 parts by weight of 30–2,016, using a mold temperature of 90°–100°F. The mix has a cream time of 20–25 seconds, a rise time of 75–85 seconds and a demold time of 5 to 8 minutes. The free rise core density will be about 3.5–4.0 pounds per cubic foot.

Depending upon the mold temperature, type of resin, etc., the overall density of the finished liner will range from about 4.5 to 15.0 pounds per cubic ft. with a molded core density running from about 1.0 to 11.0 pounds per cubic foot. The tensile strength of the overall unit is from 25.5 to 250 pounds per square inch while the core tensile strength runs from about 20–100 pounds per square inch and an elongation of about 75–200 percent. The tear strength will run from about 5.0 pounds per linear inch to about 8 pounds per linear inch.

The skin has a Shore A hardness in the range of 30–150, an ultimate elongation of from 75 to 200 percent, a tear strength Die C of 50–200 pli and high abrasion resistance. The permeability of skin must be sufficient to pass water and air from the vibrated concrete into the core, which is open celled, permitting air to separate from the water and pass up the core. The water remains in the core. The skin includes microscope pores and has a permeability in the range of from about 100 milli darcies to about 10 darcies, but should not pass solid material from the concrete matrix.

The action of the liner of the invention is shown in FIG. 4, where the liner having an open cell foam core 20 and a decorative mold face 24 is secured to a concrete mold panel 51 contacted by the back skin 30 on the core 20. The backing skin 30 is planar and is in face engagement with the panel 51. Freshly poured concrete 50, filled into the form, is vibrated, and the large arrow indicates movement of water and air from adjacent interface of the concrete vibrated from the matrix mass. The bubbles of water and air accumulate at the interface of the concrete and the form liner. Since the skin 24 is porous, the water and air pass through the skin into the open cell core 20. In the core water separates from the air and the air passes upwardly through the water and open cells out of the core, while the cells act as a reservoir for water which stays in as a sheet generally in contact with the face of the concrete through the porous skin. The vibrated concrete, with the release of the accumulated water and the air forms a dense "skin" in the finished concrete. This provides a smooth surface free of bug holes, flaws and the like which could normally form if the water and the air were not removed. The densification of the concrete may extend for an inch or so into the concrete and the resulting surface is very uniform without flaws. As the concrete hardens and cures it takes up water of crystallization, and the water in the core is available for movement out of the core back into the concrete. As the concrete cures and water in the interstices of the concrete matrix is taken up, a slight vacuum is formed at the interface of the concrete and the liner tending to draw water from the liner. The movement of the water and air through the skin into the open cell core and the passage of water from the core back into the concrete is akin to osmosis. The pores through the skin are microscopic which permits the passage of water but not the solid material in the concrete; thus the water passes into the core generally contains only dissolved material and none of the suspended material of the concrete. This procedure produces a hard cure for the concrete, much in the manner of wetting down the concrete during curing as is conventionally done.

As the concrete is being poured into a form with the foamed liner, the liner begins taking up water and the hydrostatic head in the core balances the hydrostatic pressure of the concrete generally preventing collapsing of the foam so that the exact detail of the negative form is impressed into the surface of the concrete. After the concrete has cured sufficiently to permit removal of the form, air may be forced back through the core to aid in stripping the form liner from the concrete.

The form liner of the invention provides an additional use in impressing the top of a layer of freshly poured concrete with the impression of the face of the liner. This is useful for in site casting and stack casting. This is accomplished by pouring concrete into a rectangular mold lying on the ground or solid planar surface. After pouring and vibrating, the liner may be laid on the fresh concrete with the negative mold side down. The liner may be lightly rolled and/or sprayed with water, making it heavy enough to make good contact with the concrete. The concrete takes the impression of the liner, and liner takes up water and air from the concrete, so that it is in close contact with the concrete. As the concrete cures, it takes up water from liner, forming a hard, dense surface on the concrete with an accurate impression from the liner. After curing, the liner is removed from the concrete, the form is moved up and a layer of Visqueen or sheet of film plastic, is placed on top of the concrete. A second batch of concrete may be poured on the first and the liner applied as before. After each pour and cure the liner is removed and a plastic sheet placed over the layer. In this manner two or more layers of concrete panels may be made in a stack. The finished panels are lifted by a crane and placed in upright position forming a wall as with other types of prefab walls. Also, by forming both the front and rear skins of the liner, air may pass through concrete contacting skin, through the core and out the rear skin, when the liner is in horizontal position. Also, additional water may be added by sprinkling the top skin of the liner.

The liner of the invention may be of a thickness extending from about ⅛ of an inch up to a foot or so in thickness, or even thicker if desired, and the thickness is generally related to the thinnest portion of the liner. Due to the negative mold configuration of the skin on one side, the thickness may range from an eighth of an inch on up for any particular liner. The permeability of the liner skin may be adjusted by using more or less solvent in making the form in a mold. The usual permeability of the skin may thereby be adjusted. The overall weight of the foamed liner is considerably less than for the same volume of a solid liner. Therefore, handling of the liner is easier. Further, for most liners, one man can lift and carry the liner. Also, the attachment of the liner to forms is less of a problem.

The liner of the invention is an economical, lightweight unit formed of a two density system of which the core is the lighter. The dense skin over the core actually bridges across the porous core providing a rigidity against collapse of the liner under the weight of the concrete in the form helped by non-compressible water. Such liners are generally useful for from one to ten uses, although some types may readily be used for more than ten pours.

The polyurethane forms are basically prepared from the reaction products of a polyol and a polyisocyanate. The commercial products are generally sold as a two liquid system, as shown above. The products are made to rise or foam by means of a blowing agent. The polyols most commonly used are the polyethers and the polyesters while the polyisocyanate is most commonly used as an isomer of polyethylene diisocyanate or diphenylmethane diisocyanate. In some instances, polymethylene-polyphenyl diisocyanate is, also, used. The blowing agent may be carbon dioxide gas, which is generally formed in situ by the reaction of the water and a calculated excess of the isocyanate in the mixture. Plural carbon blowing agents are also used. Generally, the flexible foams of the polyethers offer lower cost and good abrasion characteristics for the liners.

The reaction of the polyols and polyisocyanates may be made to take place by use of catalysts, for example, tertiary amines, etc. Blowing agents, surfactants, plasticizers and the like may be used in the reaction mixture. Normally, the ingredients of the reaction mixture are liquid, with the viscosity in suitable ranges for pumping, metering or mixing. Normally, the reaction ingredients are sold in liquid forms with the prepolymer consisting of the polyol and the isocyanates and a second liquid which is an additional polyol, catalyst, blowing agent, etc. After the two components are mixed in proper proportions, foaming occurs, usually at room temperature. The liners are then formed by reacting the ingredients in a mold in which the bottom of the mold is a design of the desired design of the finished concrete. Thus a slab of the liner is formed in the mold by pouring a mixture of the two liquids directly into the mold and then placing a cover on the top of the liquid mixture which permits a skin to form on both sides as the reaction occurs foaming the plastic. The reaction mixture adjacent positive design of the mold produces a skin in a configuration of the design of the mold, while the cover produces a planar skin surface on the opposite side of the slab. where desired a paper, cardboard or fabric sheet may be placed on the top ofthe liquid so that when the liner is formed, it will have a textile, paper, or other reinforced backing adjacent the smooth skin of the liner. This technique of forming the slabs in the mold produces a high density skin on the textured surface as well as on the opposite or smooth side of the liner.

The liners thus formed provide a liner with a soft, open cell, flexible core with an integral tough skin on both sides to provide firm support for concrete. The liner is essentially breathable, and it provides a cellular reservoir for water with a tunnel for the air in an upward diffusion of air from the water entering the cellular core. The reservoir of water which passes back into the concrete on curing voids the need for a release agent, since water is in contact with the surface of the concrete when it normally sticks to the mold or form. Since a release agent is not generally needed there will be no staining of the resulting concrete from normally used release agents.

The liner according to the invention may be made in various sizes of sheets arranged to fit concrete molds. They may be made in such sizes as 2 and 4 foot widths, and 4, 6, 8, 10, 12, etc. lengths. The liners may be made to mate with the panels of the concrete forms or so they may overlap the joints of the concrete to provide a smooth surface in the concrete without any joint marks. Since the elastomeric material is a soft, foam plastic, it butts smoothly with an adjoining liner under the weight of the concrete so that no joint mark is visible.

I claim:

1. In combination with smooth surfaced panels for concrete forms for making structural members, a liner comprising an independently formed sheet of soft, flexible, resilient elastomeric, synthetic polymer having an open cell foam core and front and rear skins of dense, tough, abrasion resistant polymer and at least said front skin containing microscopic pores capable of passing air and water but not the matrix and fines of a concrete mix; said rear skin being smooth and said front skin having a concrete contacting face formed as a negative mold of a desired pattern; said liner being at least about ⅛ inch thick at its thinnest section; said core having a density of about 3–10 pounds per cubic foot, a tensile strength of 40–150 pounds per square foot, a tear strength Die C of 2–30 pounds per linear inch, and the skin has a Shore A hardness of 20–90 and ultimate elongation of 75–200 percent, a tear strength Die C of 50–200 pounds per linear inch, and high abrasion resistance.

2. The combination of claim 1 wherein said front and rear skins on said core is integral.

3. The combination of claim 2 wherein said front and rear skins are of the same material as said core and is formed integrally therewith.

4. The combination of claim 1 wherein said rear skin includes a backing member.

5. The combination of claim 1 wherein said liner is sufficiently soft to seal against an adjoining liner to form a seamless joint.

6. The combination of claim 1 wherein said synthetic polymer is a polyurethane.

7. The combination of claim 1 wherein said core has sufficient open cells to permit the separation of air and water therein, and permit air to pass upwardly through said core.

* * * * *